United States Patent [19]

Hughes

[11] 4,248,831
[45] Feb. 3, 1981

[54] DECOMPOSITION BOMB AND CLAMP MEANS

[75] Inventor: Terence C. Hughes, Parkville, Australia

[73] Assignee: The University of Melbourne, Parkville, Australia

[21] Appl. No.: 924,670

[22] Filed: Jul. 14, 1978

[30] Foreign Application Priority Data

Jul. 14, 1977 [AU] Australia ............... PD0846

[51] Int. Cl.³ .............................................. B01L 3/00
[52] U.S. Cl. ................................. 422/102; 220/256; 220/314; 220/315; 220/410; 292/257; 422/241; 422/242
[58] Field of Search ............... 422/102, 241, 242, 310; 220/256, 408, 410, 314, 315, 300; 292/257

[56] References Cited

U.S. PATENT DOCUMENTS

| 1,587,581 | 6/1926 | Frautz ................................ 292/257 |
| 1,795,780 | 3/1931 | Kiernan ......................... 220/256 X |
| 2,508,597 | 5/1950 | Dalrymple .................... 292/257 X |
| 2,613,011 | 10/1952 | Foreshaw-Smith ............. 220/256 X |
| 3,483,089 | 12/1969 | Brewer ............................ 422/102 X |
| 3,933,440 | 1/1976 | Woolley ............................. 422/102 |
| 4,151,929 | 5/1979 | Sapien .............................. 220/256 |

FOREIGN PATENT DOCUMENTS 267597  8/1970  U.S.S.R. ................................... 422/102

*Primary Examiner*—Arnold Turk
*Attorney, Agent, or Firm*—J. Harold Nissen

[57] ABSTRACT

A decomposition bomb in which intractable materials can be dissolved including a generally cylindrical hollow body, a liner of a chemically inert material within the body and extending over the upper edge thereof, a plug of chemically inert material which extends above the portion of the liner extending over the body and a closely fitting cap which is a hollow cylinder which can pass over the body, the liner and the plug to prevent movement of the liner and the plug. The invention also includes in association with the bomb a clamp within which the bomb can be located and which has a locking member having a pin bearing upon two ramps so that on partial rotation of the locking member pressure is applied to the cap of the bomb.

7 Claims, 3 Drawing Figures

U.S. Patent
Feb. 3, 1981
4,248,831
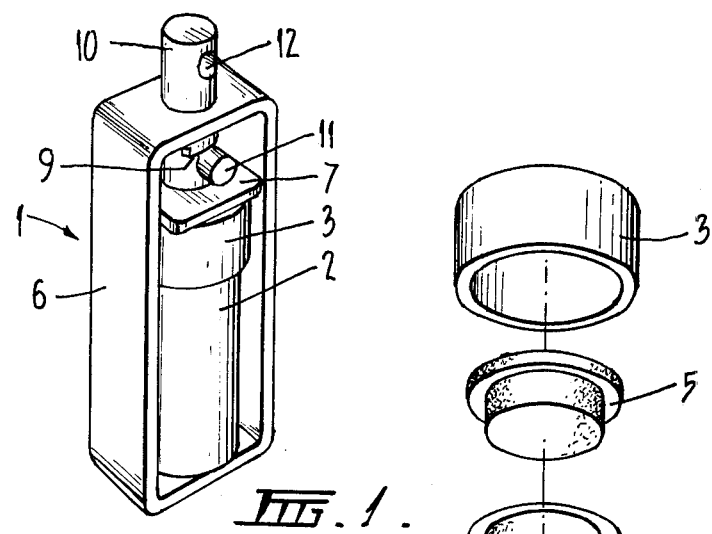
*Fig. 1.*
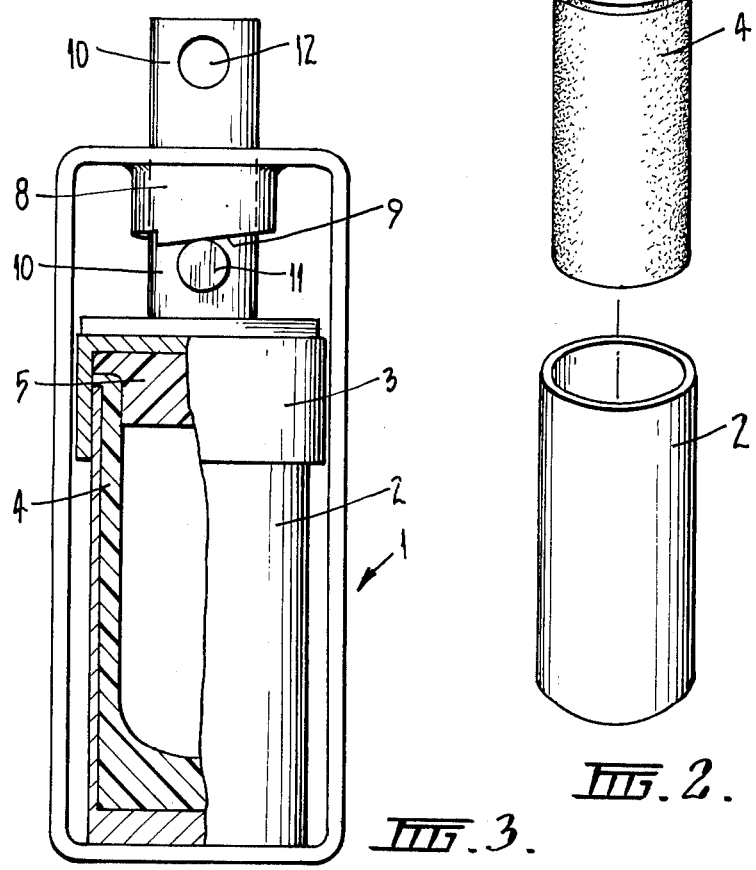
*Fig. 3.*  *Fig. 2.*

DECOMPOSITION BOMB AND CLAMP MEANS

This invention relates to decomposition bombs and in particular to such bombs which are used to provide extremely high pressures to facilitate the decomposition of intractable materials such as the decomposition of minerals by acids.

Decomposition bombs are themselves known and they are very often relatively small containers which may have a capacity of as little as 25 ml which containers are adapted to be sealed and placed in an oven. Conventionally such bombs are heated to the order of 110°–150° C. and such heating can build up a pressure of up to 1200 p.s.i.

Such bombs, conventionally, have a cylindrical metal casing which may be externally screw threaded at its open end and in which casing there is a liner of resistant material such as polytetrafluoroethylene (PTFE). Conventionally these liners have been provided with an outwardly extending skirt which lies over the edge of the bomb body and forms a seal with a further PTFE member which is located in a cap which is internally threaded, thus when the cap is firmly screwed onto the body the seal is made. These conventional bombs have, we have found, three major disadvantages. The first of these is that even through a good seal is made when the bomd is cold, the differences in the expansion of the body and the cap can cause this seal to deteriorate and there can be leakage of the contents of the bomb through the seal and into the threads of the body and cap. As these threads are extremely hot, the area appears to be very reactive and on occasions it has been found to be difficult, if not impossible, to remove the cap after the bomb has cooled, because of corrosion of the threads.

The second disadvantage is that as the PTFE which lies across the top of the body is basically unsupported this tends to flow under high temperatures and thus the temperature at which bombs of this type can satisfactorily be used is restricted and, generally, we have found it unsatisfactory to use such bombs at a temperature of more than about 150° C.

The third disadvantage of these previous bombs is their cost. They must be relatively thick-walled so as to provide a substantial upper surface over which the PTFE extends to give a good seal at the top and the bomb must be machined to provide an accurate external thread.

It is the object of our invention to provide a decomposition bomb which minimizes the disadvantages of previous bombs.

The invention provides a decomposition bomb comprising a body, a liner in and having a portion extending over the open end of the body, a plug adapted to be located within the open end of the liner and having a portion which extends over the outwardly extending portion of the liner and a cap which is locatable over the plug and the body and closely abuts the outwardly extending portion of the liner and the plug and the outer surface of the body. Preferably the liner and the plug are made from a slightly resilient chemically inert, synthetic plastics material, such as PTFE.

We also provide, in combination with the bomb of the invention, a clamp having a base upon which the bomb can sit and a moveable member which can apply pressure to the upper surface of the cap.

In order that the invention can be more readily understood, we shall describe, with reference to the accompanying drawings, one form of decomposition bomb which is made in accordance with the invention.

In these drawings:

FIG. 1 is a perspective view of the bomb and clamp assembly of the invention,

FIG. 2 is an exploded perspective showing the components of the bomb; and

FIG. 3 is an elevation, partly in section, of the bomb assembly.

The bomb assembly 1 comprises the bomb itself and a clamp.

The bomb has a body 2 which is cylindrical and which may be turned from a single piece of metal but which, preferably, can be made from metallic tubing, preferably drawn tubing rather than seamed tubing. The material of the body is not critical as the body does not come into contact with chemicals, but satisfactory results have been obtained from the use of mild steel but stainless steel may well be the preferred material. The size of the bomb is not part of the invention but it may well have a diameter of between 2 to 4 cm and a height of 6 to 7 cm.

Located within the body there is a liner 4 which is preferably of PTFE and which may be machined or moulded. This liner has a peripheral outwardly directed annular extension the size of which is adapted to reach to the outer extremity of the body, as can best be seen from FIG. 3.

The bomb has a plug 5 which is preferably also of PTFE and which has a central portion adapted to be received in the liner and adapted to closely abut the liner when so located. Although not illustrated the underside of the plug may be recessed so that at the periphery of the plug there is a relatively thin skirt. The upper surface of the plug is provided with an annular extension which is adapted to overlay the extension of the liner and to have the same radius as the extension of the liner. Thus, when the plug is located there is effectively an extension of the side wall of the bomb, which extension comprises the extensions of the liner and the plug.

The bomb has a cap 3 which is simply a shell having a closed end and a downwardly direct cylindrically shaped skirt. The internal diameter of the cap is such that this skirt closely overlays the body of the bomb and the extensions of the liner and the plug.

Used in association with the bomb there is a clamp assembly which has a generally rectangular body 6 which may be made of stainless steel or other metal and which is of such a size as to relatively closely receive the bomb. The body 6 has an apertured downwardly directed extension 8 which, at its lower edge is provided with a pair of ramps 9, only one of which is shown, which ramps provide cam surfaces for sealing the bomb.

There is also provided a locking member 10 which is also generally cylindrical and is adapted to be received in the aperture of the extension, from beneath. The locking member 10 has a pin 11 passing therethrough beneath the ramps 9. The member 10 also has an aperture 12 therethrough, the aperture being adjacent the top of the member 10.

We also provide a pressure plate 7 which lies between the lower edge of the member 10 and the upper surface of the cap 3, when the bomb and clamp are assembled.

On complete assembly, as shown in FIGS. 1 and 3, rotation of the locking member 10 causes its pin to ride on the ramps 9 and thus the member is forced downwardly onto the pressure plate 7 which, in turn, forces the cap downwardly and forms a seal between the liner 4 and the plug 5.

In use the material to be decomposed and the decomposition chemicals are placed in the bomb. The plug 5 is located in position in and overlying the liner 4 and the cap 3 is located over the body and plug. The bomb is then located in the clamp and the locking member 10 is rotated, as with a tommy bar passed through the aperture 12, thereby applying pressure to the cap. It will be seen that when this pressure is applied the PTFE is fully supported except on the underside of the plug and within the body of the bomb thus, no matter what internal pressure is developed in the bomb, the PTFE cannot flow as there is no unsupported area through which it can flow. We have found that because of this we can operate the bomb of the invention to temperatures up to approximately 260° C., which is close to the temperature at which PTFE softens. At the same time, we have found that there is no leakage, provided that the components are in good condition and because of these conditions the pressure inside the bomb can be significantly greater than that previously obtained. At the same time the bomb is simpler and cheaper to manufacture than previously known bombs because the machining is minimal.

I claim:

1. A clamp for a decomposition bomb comprising:
   a body shaped to receive a decomposition bomb therein;
   means associated with said body whereby when a decomposition bomb is located therein pressure can be applied to the cap of the decomposition bomb, said means to apply pressure to the decomposition bomb cap includes:
   an apertured extension directed inwardly from said body and above the cap of said bomb, when located;
   a ramp at the lower end of said extension;
   a generally cylindrical locking member in said extension aperture; and,
   a pin adjacent the lower end of said locking member, the lower end of said locking member being closely adjacent the top of said bomb and said pin being contactable with said ramp whereby on rotation of said locking member it is moved downwardly to apply pressure to the top of said decomposition bomb.

2. A clamp as claimed in claim 1, wherein said body is rectangularly-shaped and is formed of metal strips.

3. A clamp as claimed in claim 1 or 2 wherein there are two diametrically opposed, but otherwise similar, ramps and the pin extends diametrically and beyond the body of the locking member.

4. A clamp as claimed in claim 1 or 2 including a pressure plate adapted to be located between the locking member and the bomb cap.

5. A bomb assembly comprising in combination, a decomposition bomb and a clamp therefor;
   a bomb body having an open end;
   a liner in and having an outwardly extending portion extending over the open end of said bomb body, said liner having an open end;
   a plug adapted to be located within the open end of said liner and including a portion which extends over the outwardly extending portion of the liner;
   a cap which is locatable over said plug and said bomb body and closely abuts the outwardly extending portion of both said liner and said plug and the outer surface of said bomb body;
   a clamp body shaped to receive therein said bomb body; and,
   means associated with said clamp body whereby when said decomposition bomb is located therein pressure can be applied to said cap including:
   an apertured extension directed inwardly from said clamp body and above said cap when located;
   a ramp at the lower end of said extension; and
   a locking member rotatably received in said extension aperture and a pin adjacent the lower end of said locking member, the lower end of said locking member being positioned to be closely adjacent the top of said bomb and said pin being contactable with said ramp whereby rotation of said locking member moves said locking member downwardly to apply pressure to the cap of the decomposition bomb.

6. The bomb assembly as claimed in claim 5, wherein said bomb body is metallic, formed from a cylindrical annulus, and closed at one end,
   said cap also being metallic and complimentary to said bomb body, the internal diameter of said cap being such that it is a close fit about the body,
   said means to apply pressure to said cap includes an apertured extension directed inwardly from said clamp body and above said cap, when located,
   a ramp at the lower end of said extension, and
   a generally cylindrical locking member in said extension aperture and a pin adjacent the lower end of said locking member, the lower end of said locking member being closely adjacent the top of said bomb and said pin being contactable with said ramp whereby on rotation of the locking member it is moved downwardly to apply pressure to said cap.

7. The bomb assembly as claimed in claim 5, wherein said clamp body is rectangular and is formed of metal strips.

* * * * *